INVENTOR.
GEORGE J. PLATT
BY
Wheeler, Wheeler & Wheeler
ATTORNEYS

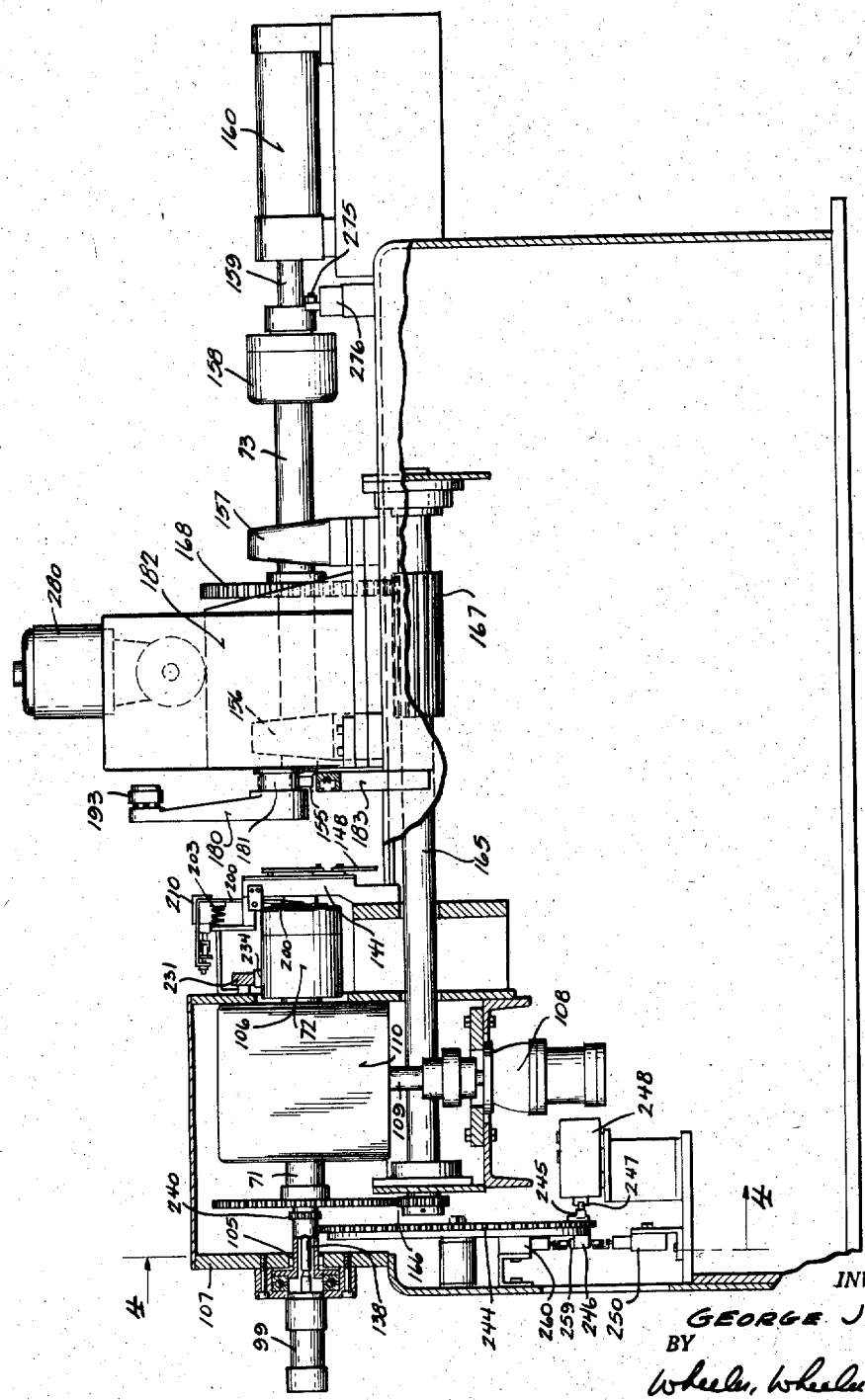

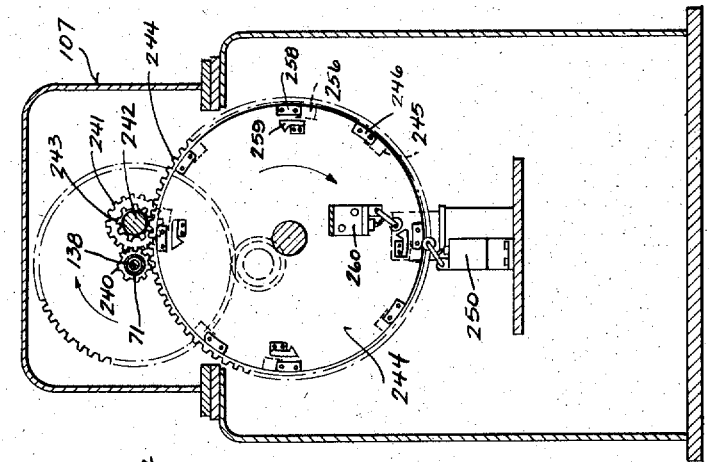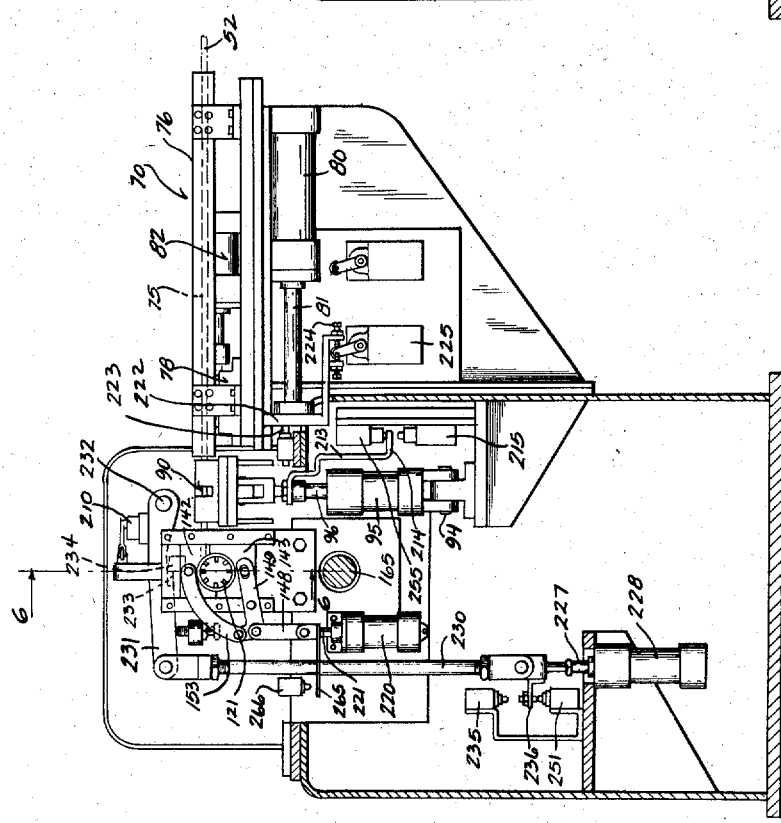

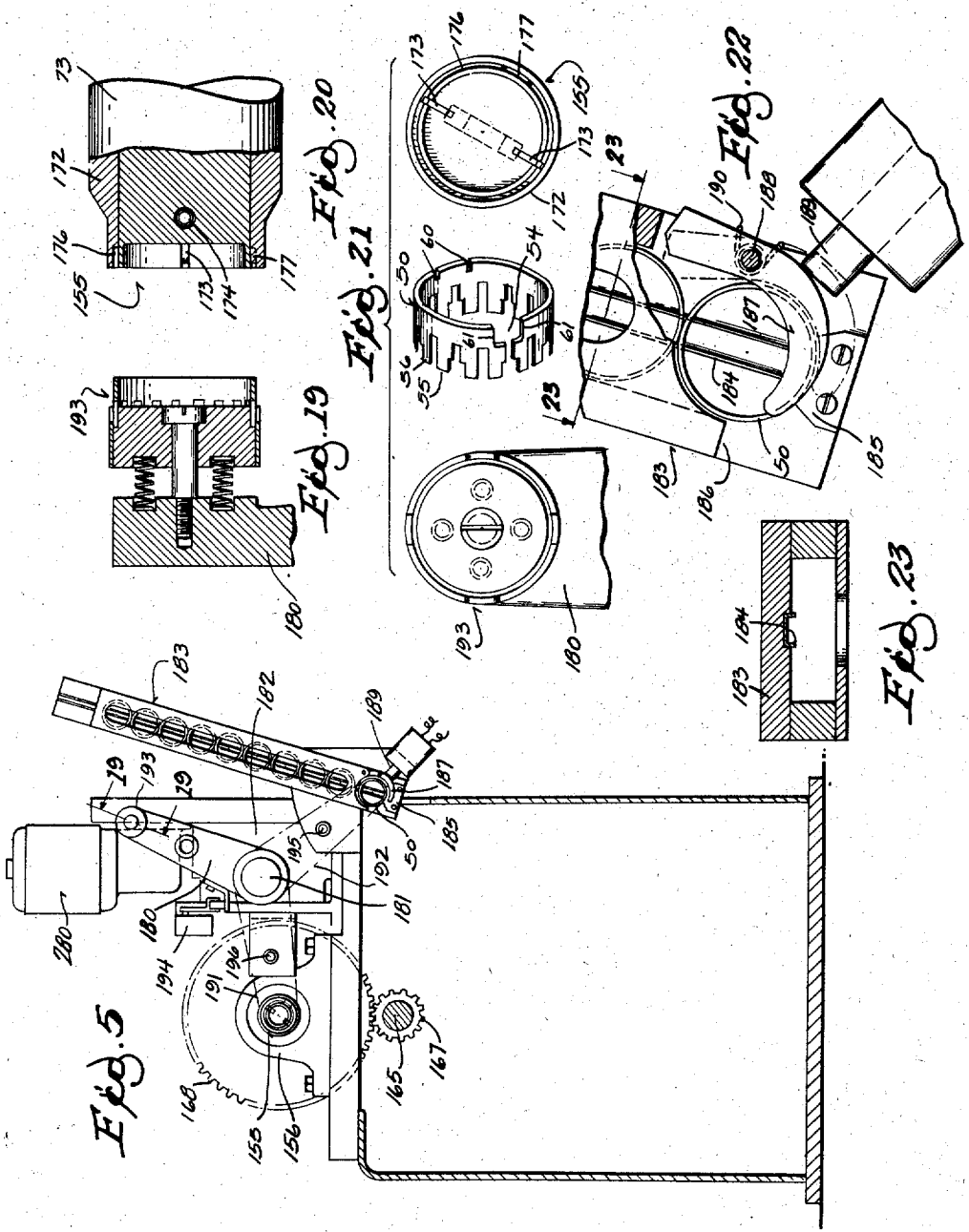

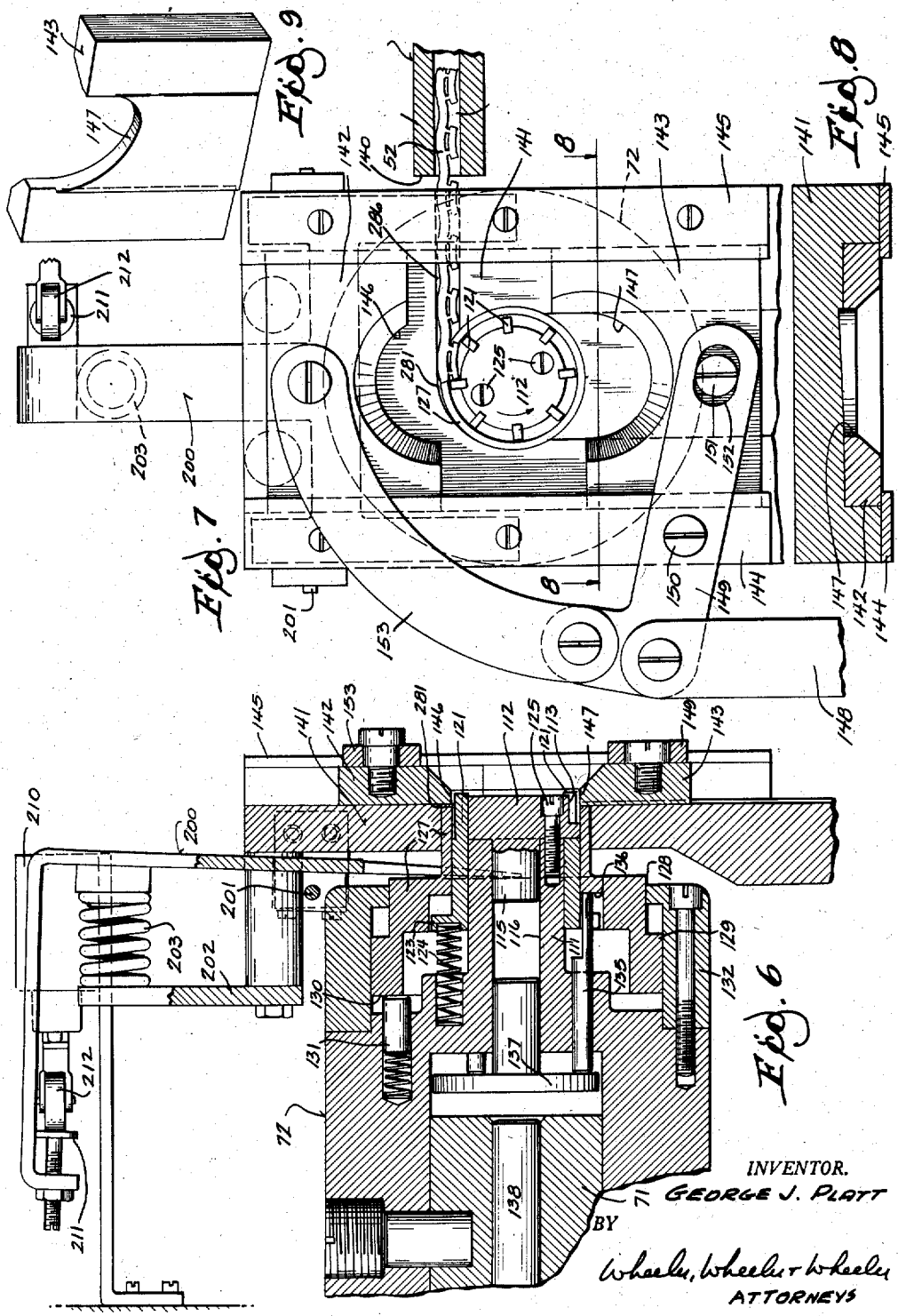

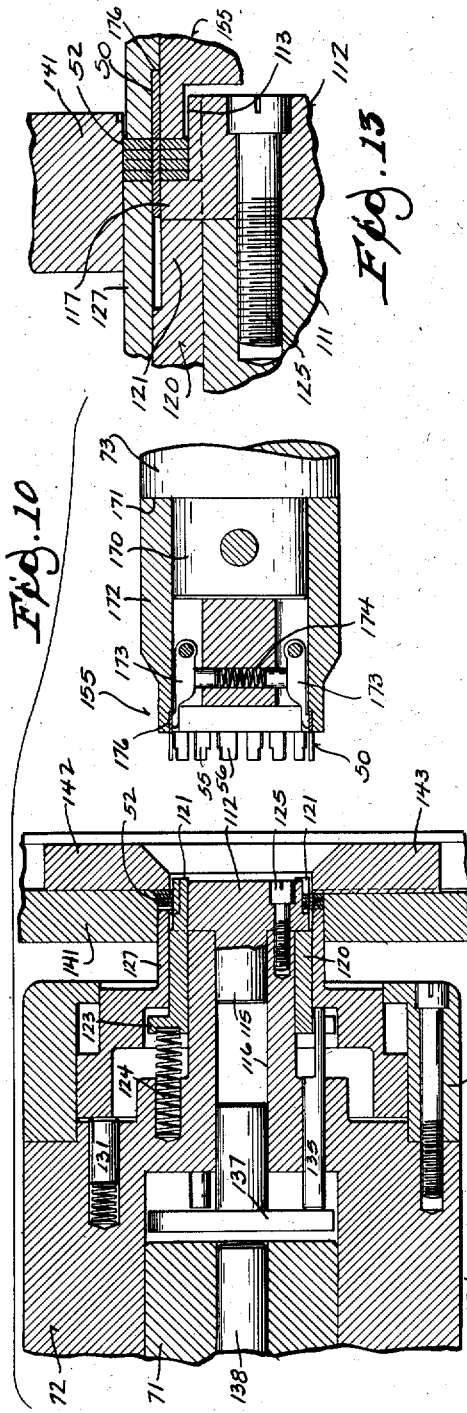
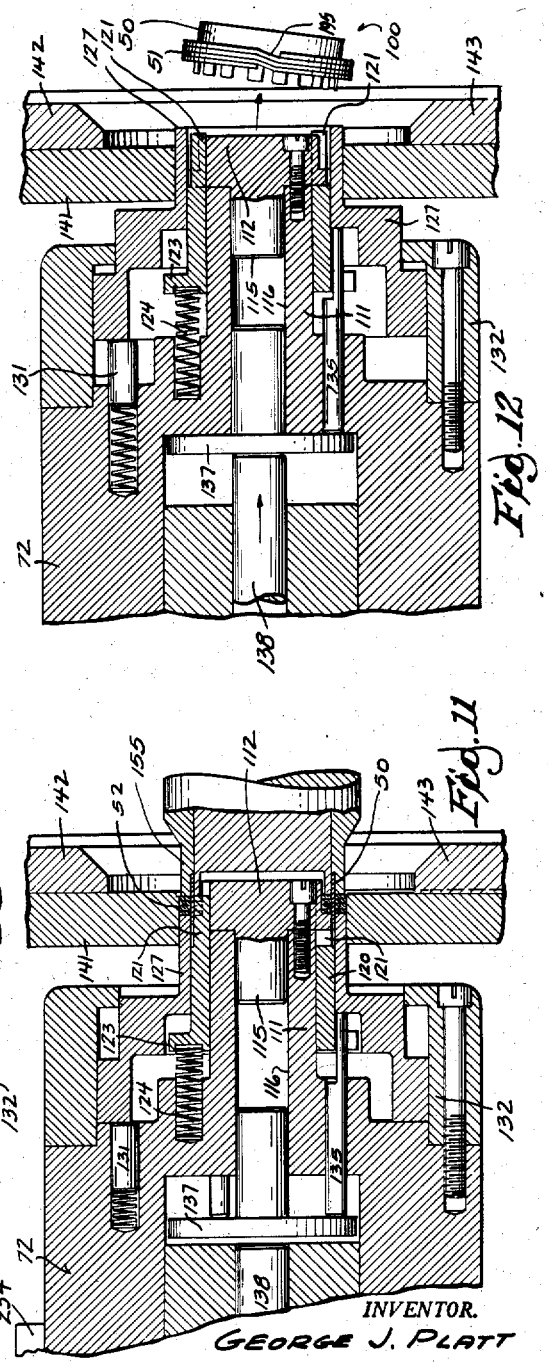

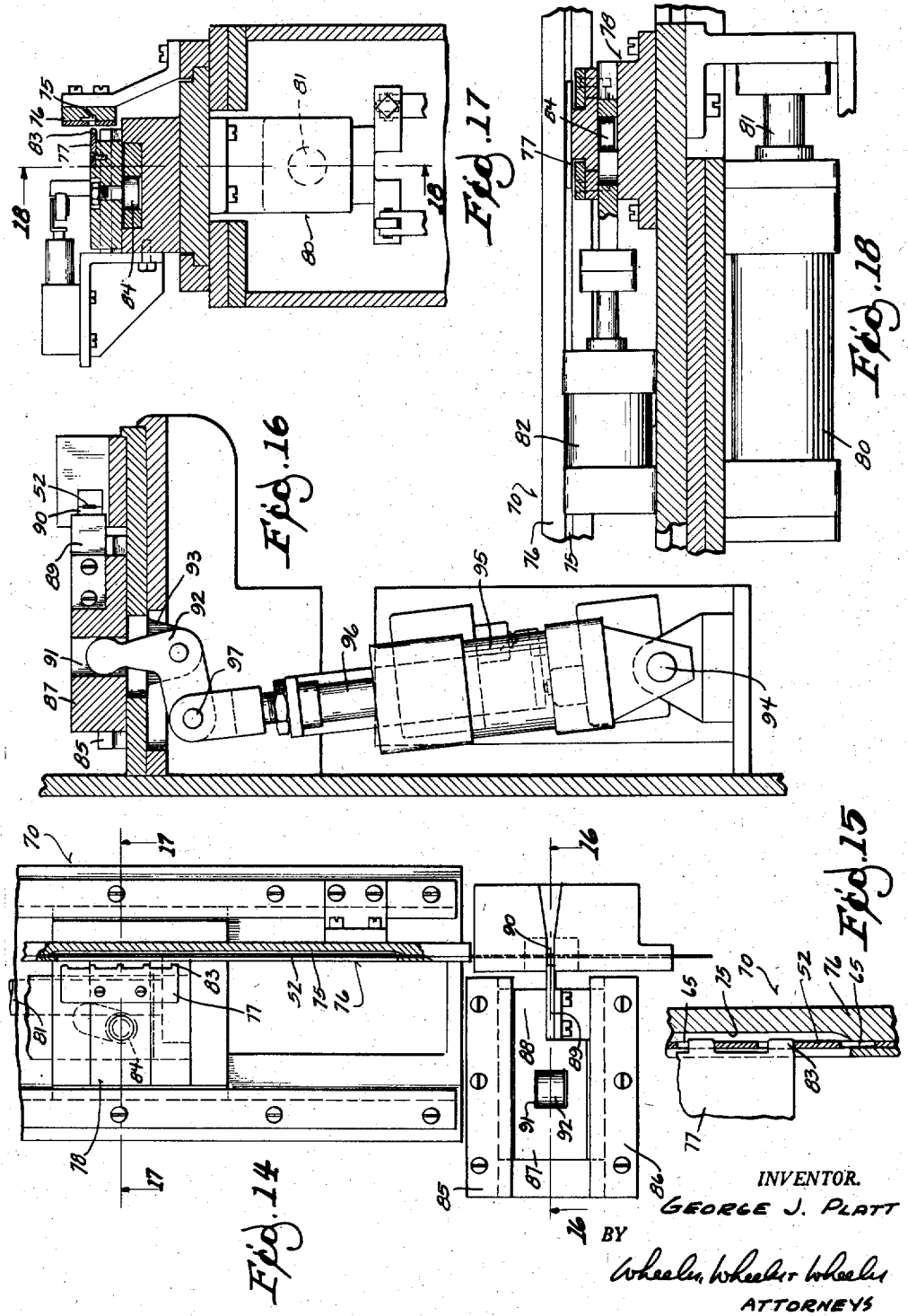

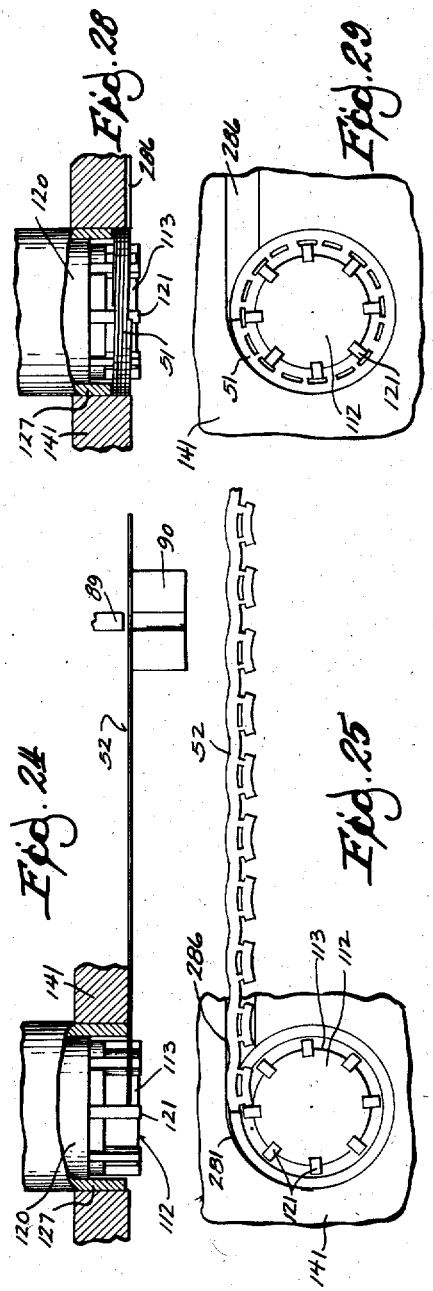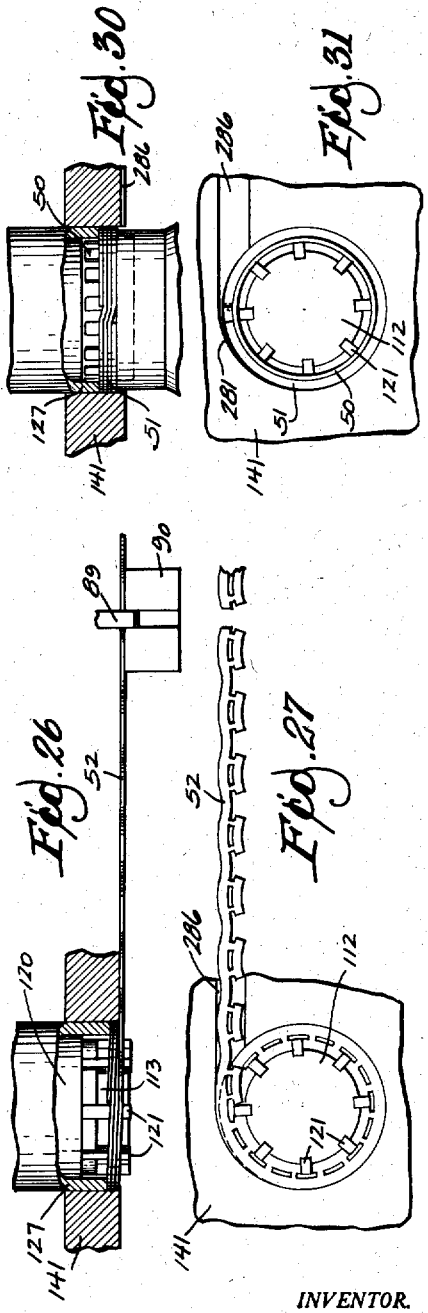

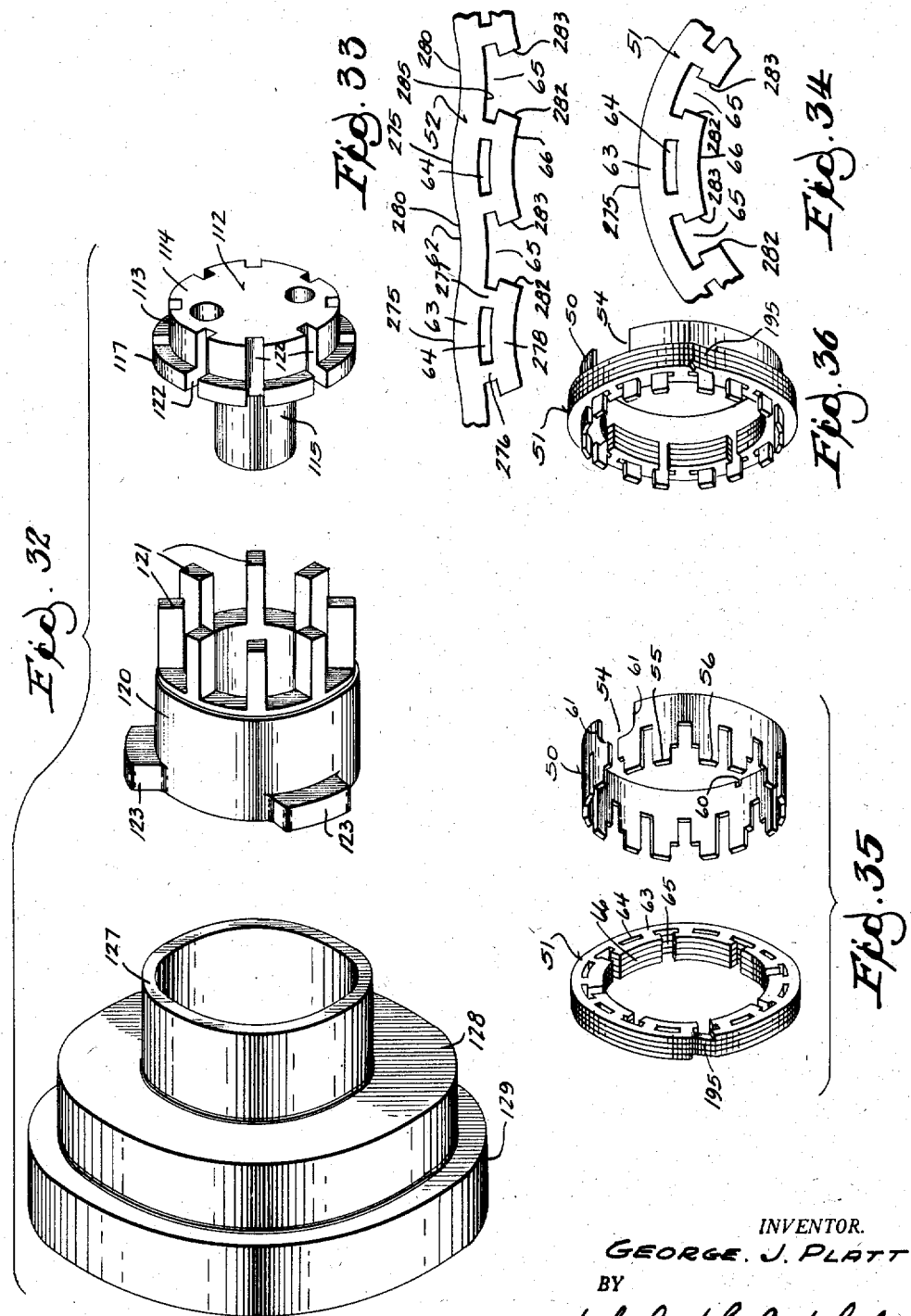

United States Patent Office 2,920,594
Patented Jan. 12, 1960

2,920,594

SPECIAL MACHINE AND PROCESS FOR EDGE WINDING SHADING MATERIAL AND ASSEMBLING ELECTRIC MOTOR POLE PIECES THEREWITH

George J. Platt, Manitowoc, Wis., assignor to Paragon Electric Company, Two Rivers, Wis., a corporation of Wisconsin Application July 20, 1956, Serial No. 599,138

9 Claims. (Cl. 113—1)

This invention relates to a special machine and process for edge winding shading material and assembling electric motor pole pieces therewith.

Heretofore, it has been common to provide an arrangement of pole pieces for a synchronous motor wherein a band of sheet metal has been formed into a hollow thin walled cylinder, one end edge of which is notched to provide spaced pole pieces. The notches between the pole pieces are sufficiently deep so that, according to prior practice, flat washer-like laminations of copper properly perforated or notched were impaled upon the pole pieces in successive laminae in sufficient number to accomplish a shading of the pole pieces and still leave the extremities of the pole pieces extending through the laminations sufficiently to be exposed for magnetic interaction with an armature mounted to rotate upon an axis concentric with the cylindrical pole piece band. It has been found, as described in the co-pending U.S. patent application of George J. Platt, Serial No. 405,528, filed January 22, 1954, that superior results are obtainable electrically and great economy of manufacture is obtainable by forming the layers of copper upon the pole pieces in the form of a helical continuous strip edge wound and properly punched and notched for application to the pole pieces without necessity for blanking out separate washer shaped laminations. One of the obvious economies results from the avoidance of the blanking out of circular discs of expensive copper or other shading material since the punching and notching of a strip only involves scrap in the form of relatively small percentages of such strip material.

In the instant invention, it has been found possible in a continuous and automatic operation to feed strip material for pole shading purposes through a punch press to properly punch and shape the strip, and to pass the prepared strip into a machine which, as to one phase of operations, feeds and cuts the strip, winds it into edge wound helical configuration upon a mandrel, and as to another phase of the operations receives bands of cylindrical pole piece material and assembles them successively with the edge wound helical shading material. Thus the machine of the instant invention accomplishes without the necessity for manual intervention the entire feeding and assembly of shaded components of an electric motor as described below.

In the drawings:

Fig. 2 is a front elevation of the machine shown in Fig. 1, the housing and frame and certain parts thereof having been broken away and shown in vertical section on line 2—2 of Fig. 1.

Fig. 3 is a section on line 3—3 of Fig. 1.

Fig. 4 is a section on line 4—4 of Fig. 2.

Fig. 5 is a section on line 5—5 of Fig. 1.

Fig. 6 is an enlarged section on line 6—6 of Fig. 3.

Fig. 7 is an elevation as viewed from the right and showing the mechanism of Fig. 6.

Fig. 8 is a section on line 8—8 of Fig. 7.

Fig. 9 is a perspective of the lower gate showing principally the left side of the gate as seen in Fig. 6.

Fig. 10 is a composite view of the parts shown centrally of Fig. 6, but with the pole piece band, and the mandrel and chuck for holding it, in an intermediate position of advance toward the edge wound shading material, which in this view has been helically edge wound; and the gate is in readiness for retraction to permit the ring of pole pieces to be assembled with the shading material.

Fig. 11 is a view similar to Fig. 10, but showing the gates retracted and the pole ring advanced in its chuck to complete the insertion of the poles through the helically coiled shading material.

Fig. 12 is a view similar to Fig. 11, the chuck and mandrel having been retracted and the ejecting mechanism advanced for ejection of the completely assembled product which is shown dropping away from the winding mandrel.

Fig. 13 is a fragmentary section in greatly enlarged view showing a portion of Fig. 11 to exhibit the relation of the helically coiled edge wound shading material impaled by a pole of the pole ring immediately prior to the retraction of the chuck which has assembled the pole ring into the shading material.

Fig. 14 is an enlarged fragmentary view of a part of the apparatus shown in Fig. 1 for advancing and severing the strip of shading material.

Fig. 15 is a still more greatly enlarged detail of a portion of the strip shading material shown in Fig. 14.

Fig. 16 is a section on line 16—16 of Fig. 14 and including the hydraulic operating mechanism for operating the severing die.

Fig. 17 is a section on line 17—17 of Fig. 14.

Fig. 18 is a section on line 18—18 of Fig. 17.

Fig. 19 is a section on line 19—19 of Fig. 5.

Fig. 20 is a view somewhat similar to the chuck portion of the apparatus shown in Fig. 10, but the section of the part broken away in Fig. 20 being on a different diameter, and disclosing the key which holds the pole ring in proper position.

Fig. 21 is a composite view of the pole ring transfer head, a perspective of the pole ring itself, and an end view of the chuck showing the key for positioning the pole ring in the chuck.

Fig. 22 is an enlarged elevation of the lower portion of the pole ring stock finger shown in Fig. 5.

Fig. 23 is a section on line 23—23 of Fig. 22.

Fig. 24 is a plan view showing the feed of strip material through the strip cut-off device and onto the edge winding mandrel, portions of the apparatus being broken away and shown in horizontal section.

Fig. 25 is a front elevation of the apparatus shown in Fig. 24, but without breaking away any of the portions.

Fig. 26 is a view similar to Fig. 24 but showing the position of the parts at a time when the edge winding of the strip upon the mandrel has progressed to the point where three turns of the pole shading material have been wound and the cut-off die has been actuated for a cut-off operation.

Fig. 27 is a view similar to Fig. 25 but showing the edge winding in the condition shown in Fig. 26.

Fig. 28 is a view similar to Fig. 26 but excluding the cut-off die apparatus and showing the status of edge winding when all of the shading material for a given operation has been wound on the mandrel.

Fig. 29 is an elevation of the apparatus and edge wound material shown in Fig. 28.

Fig. 30 is a view similar to Fig. 28 but showing a pole ring forced into assembled relation with the shading material so as to straighten and align the end turns of the shading material.

Fig. 31 is an elevation similar to Fig. 29 but showing the pole ring in position after retraction of the chuck.

Figure 1:
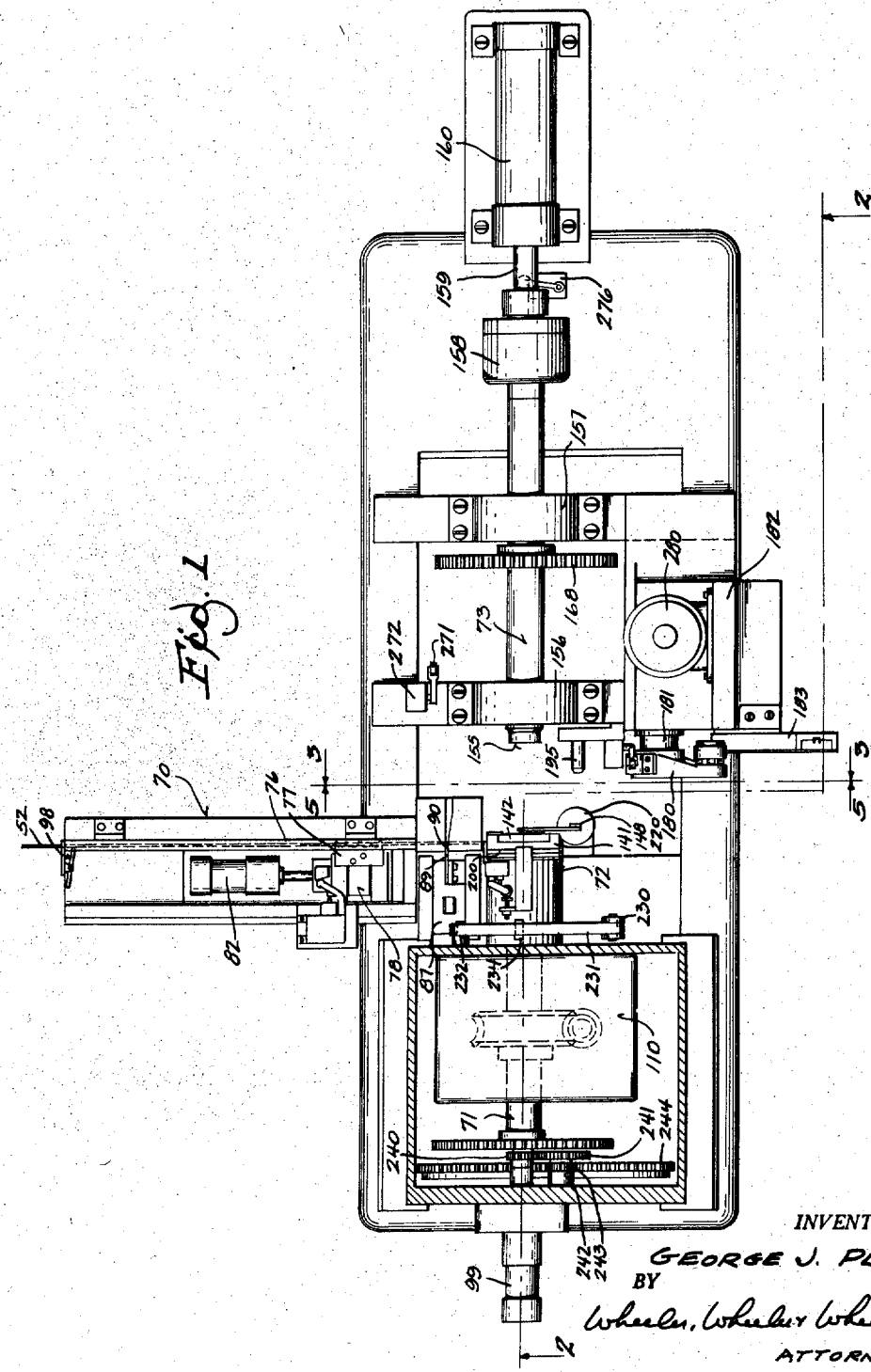
Fig. 1 is a plan view of the machine embodying this invention.

Fig. 32 is an exploded view in perspective showing at the right the mandrel for the edge winding of the shading strip; showing centrally the collar and fingers to engage with the slots in the mandrel and to project radially therefrom for engagement with the notches in the "inner" margin of the strip material; and at the left, the stepped pulley shaped ejector shaped to receive the collar and the mandrel and provide means for forcing the completed product off of the mandrel and collar fingers.

Fig. 33 is an enlarged detail (double size) in elevation showing the strip of pole shading material.

Fig. 34 shows in elevation the contours of the shading material as finally wound.

Fig. 35 is an exploded view showing in perspective the faces of the wound shading ring and the pole ring which are to be brought together in the assembly operation.

Fig. 36 shows in perspective the final assembled product.

Initially, it will be helpful to obtain an understanding of the general operation of this special machine to note the general shape and configuration of the pole ring 50, see Fig. 35, and the helically edge-wound copper strip 51 as shown in Figs. 33–36. These are the raw materials 50 and 51 which are fed into the machine and automatically handled and processed so as to complete the product shown in Fig. 36.

The pole ring 50, as indicated above, is made of a band of soft iron shaped to form a cylindrical ring split at 54 and notched to provide the several shapes and types of pole pieces 55 and 56 arranged annularly to cooperate wtih an armature, not shown, in a manner well known in the synchronous electric motor art. The end edge of the cylindrical ring 50 is provided wtih spaced guide notches 60 for purposes described below and the same edge is deeply notched at 61 at either side of the split at 54. This set of deep notches later provides an opening for passage of lead wires to the feed coil of the finished motor.

The strip of shading material 52 (see Figs. 33 and 34) has been fed through a punch press to provide the wavy contour of the margin 62 which will become the circular margin of the shading "coil" 51 in the completed product. The strip of copper provides a continuous band 63 conforming to the wavy contour and so shaped that in the completed product it provides an annular continuous ring exterior of the pole pieces of the pole ring 50. That portion of the shading material strip 52 which will be disposed interiorly of the pole pieces, and the portion to encompass the individual pole pieces is punched at 64 to snugly receive the pole pieces as will be described below. Furthermore, copper stock is removed in wide somewhat T-shaped notches 65 so that when the strip is formed and edge wound on the winding mandrel of the machine, these notches will assume a configuration which will not only receive alternate pole pieces, but will provide radially inwardly extending relatively rectangular notches. These notches not only relieve the completed copper shading ring to expose the interior surface of alternate pole pieces for electrical functional reasons, but the notches likewise provide convenient points of engagement of the shading material 52 with the edge winding devices described below.

The inner margin of the strip 52 is contoured as shown at 66 to provide the inner contour of spaced segments of shading material in generally circular form. The particular strip 52 shown in Figs. 25 and 27 is designed to make an annular shading ring, the radial dimension of which is ¼ inch, and the thickness of each layer of the completed helix is .080 of an inch.

Principal structural portions of the machine

Referring to the plan and front views respectively of the machine as shown in Figs. 1 and 2, the principal structural features and their functions include the input portion at 70 for the strip 52 of copper or other shading material; the edge winding apparatus at the left of the machine centered upon a spindle 71 equipped with an edge winding mandrel located generally at 72 at the right end of this spindle (shown in detail in Figs. 24 to 31 inclusive); and, at the right of the views shown in Figs. 1 and 2, apparatus for feeding, transferring, chucking, advancing pole rings 50 with means to assemble each ring with a shading "ring." This pole ring handling portion of the machine is centered upon a spindle 73 and this spindle rotates precisely at the same speed as spindle 71 as will be described below.

Strip input

No detailed disclosure is made herein of the machine for preparing the strip 52. As referred to above, the strip is made in the form of a continuous strip of copper or other shading material punched and notched as shown most clearly in Figs. 33 and 34. The strip is supported so as to be advanced into a slot 75 and adequate strip material maintained so that as the demands of the machine are met, there is more of the strip material to be brought into the input portion 70 of the machine. A slotted guide 76 for the strip 52 has a sufficiently open side wall on the sides at the left as viewed in Fig. 1 so that a toothed reciprocable blade 77 (see Fig. 14) can be engaged with the notches 65 along the lower part of the strip, the strip, of course, being on edge in its path of travel through the slotted guide 76.

Feed blade 77 is secured to a feed head 78 guided for forward and rearward reciprocation as shown in Figs. 14 and 16. The motion of the head in the forward and rearward reciprocation is parallel with the path of the strip which is to be advanced along the slotted guideway 76. Most of the mechanical movement provided for by the complete machine is motivated hydraulically and as to the input portion of the machine, there is a double acting hydraulic feed cylinder 80 with its ram 81 secured to the head 78 to provide power for the step by step input of the strip now to be described.

A small cylinder and ram 82 carried by the head 78 interacts with a roller and cam at 84 to move the blade laterally to the left as shown in Fig. 14 whereby to withdraw the teeth 83 of the blade 77 from the notches in the strip 52; then in the rearward movement of the ram 81, the blade is rearwardly moved sufficiently to present the blade 77 in position for engagement of the blade teeth 83 against the strip at a point in the strip sufficiently rearward of the previous position of the blade so that on the next reciprocation in a forward direction the strip will be advanced a predetermined amount equal to the distance from the rear edge of cut-off blade 89 to rear face of the finger at the top position on the mandrel.

This lateral movement to the right will again engage the blade teeth with notches in the strip 52 so that forward movement of the ram will advance the strip. The total advance of the strip under control of the cylinder and ram 80—81 of the blade 77 secured to the head 78 is 5¾ inches, which is equal to one turn of the edge wound shading coil material on the winding mandrel described below. Closely adjacent the position of the head 78 when it is in its forward position is a cut-off apparatus shown in Figs. 14 and 16. A set of ways 85 and 86 secured to the input portion 70 and provide horizontal guide devices for a cut-off head 87. At the right of the head 87 as seen in Fig. 14, there is a bracket 88 to which is secured a cut-off punch 89 so shaped as to be receivable in a female cut-off die shown at 90 slotted to receive the strip 52 in its forward movement.

Below the head 87 which is provided with a pocket 91, there is a cut-off bellcrank 92 pivotally supported upon ears such as the one shown at 93 in Fig. 16 so that the upper end of the bellcrank extends through an opening and snugly into the pocket 91. Still farther below the cut-off head 87 there is mounted to the frame of the machine at 94 a cut-off cylinder 95 having a ram 96 adjustably pivotally secured at 97 to the bellcrank 92. Thus in the thrust and retraction of the ram 96, the cut-off head 87 is thrust to the right or to the left respectively so as to complete a cycle of operations to cut off the strip 52 in timed sequence to the operation of the remaining portions of the machine as will be described below.

It will be noted as shown in detail in Figs. 26 and 27 that the strip severing operation actually cuts a short segment from the continuous upper portion 63 of the strip. This is the only scrap material which is cut from the strip and ejected from the machine after the punch press operation has prepared the strip 52 for entry into the slot at 75. During each of the operations involving advance of the strip 52, severance of the strip 52, and the retraction of the ram 81 and ram 96, any tendency for rearward movement of the strip is resisted by spring "ratchet" or latch 98 (see Fig. 1).

It will clarify the sequence of the feeding operation of strip 52 if it is understood that it is only necessary for ram 81 to feed the strip forwardly a relatively small distance and that the rest of the feeding operation is completed by the pull of the mandrel in the edge winding operation now to be described.

*Edge winding*

Reference has been made to the spindle 71 about which it may be said that the edge winding apparatus is "centered." This is a hollow spindle at the right end of which, at 72, is generally located the edge winding mandrel and associated parts which receive, wind, hold and support for assembly operations the several helical turns of edge wound strip material 52 up to the time when an ejector cylinder 99 operates to eject the completed product 100 shown in Fig. 12.

As shown in Figs. 2, 6, 7, 10 and 11, the spindle 71 is carried in bearings at 105 and 106 supported by a box-like frame 107. Between the bearings 105 and 106 are housed the various driving elements such as the hydraulic motor 108 which provides the principal drive through shaft 109 to the spindle 71 through gears in box 110 and such as the spur gears seen at the left in Fig. 2. The right end of the spindle 71 extending toward the edge winding zone 72 terminates in a tubular support of reduced diameter at 111 for the parts of the winding head. Actual winding head mandrel 112 has a cylindrical winding surface 113 (see Fig. 32) upon which the actual winding of the strip 52 is to be accomplished, and this is the peripheral surface of the cap 114 of a plug-like member 115 shaped for snug but reciprocable reception into the relatively small bore 116 of the tubular support portion 111 on the spindle 71. The cap 114 is flanged at 117 to provide abutment against a finger collar 120. This collar is provided with fingers 121 rectangular in cross section and receivable in finger slots 122 in the periphery of the cap 114 and through the flange 117. Finger collar 120 has an interior diameter for sliding fit on the support 111 and it has lugs 123 extending outwardly to receive the thrust of compression springs 124 of which there are three, symmetrically arranged. The cap 112 is secured to the end of the mandrel support portion 111 of spindle 71 by screws 125, and since the fingers 121 extend laterally outwardly of the surface 113 of the cap, the edge winding of the strip 52 is accomplished by engagement of the notched inner margin of the strip with the fingers 121 as shown most clearly in Figs. 24–27.

Encompassing finger collar 120 is an ejector collar 127 having a stepped flaring skirt-like configuration as shown at 128—129 with counterbored interior to provide room for the collar 120, lugs 123; and a flared interior margin 130 to abut spring biased plungers 131.

Finally, as to the edge winding mandrel assembly mounted upon support 111, there is an assembly collar 132 shaped annularly and flanged to permit the sliding movement of the ejector collar longitudinally of the shaft support 111.

At spaced points about the finger collar 120 and positioned between the lugs 123, there are ejector pins 135 shaped as shown clearly in Fig. 11 for reciprocation each in its separate bore and extending from within the hollow mandrel 72 into ejector contact with a shoulder 136 on the interior of ejector collar 127. For pressure upon the inner ends of the ejector pins 135, there is a mushroom headed ejector plate 137 in position to be thrust by ejector rod 138. This rod is thrust against the plate 137 by hydraulic operation of the hydraulic cylinder 99 at the extreme left end of the spindle 71 as seen in Fig. 1.

It was explained above that the slot 75 is positioned to guide the strip 52 in its passage toward the winding mandrel, and the strip then passes through the die 90. Aligned to pass the strip 52 to feed plate 141 is a strip guide 140 (see Fig. 7) behind upper gate 142 which is one of a pair of gates including lower gate 143. These gates are supported in vertical ways 144—145 and are shaped as shown in Figs. 6, 7, 8 and 9. These move toward each other to close in front of the strip 52 during the time that it is being helically wound. It is for this reason that the meeting edges 146 and 147 are contoured to conform to the path of the periphery of the fingers 121 of the winding mandrel.

It will be noted that the plate 141 against which the gates are held by the ways 144—145 is relieved at 147 to provide a slanting surface against which the strip 52 is pressed in the contouring of the helix.

Operation of the gates is accomplished by means of a gate rod 148 (see Fig. 7) extending upwardly from a hydraulic gate operator and terminating at its upper end in a lever 149 pivotally supported at 150 on one of the ways 144 so that if the rod 148 is raised, gate 143 is opened with its downward motion under control of shoulder bolt 151 extending into the gate through slotted opening 152 in lever 149. At the same time, the upper gate 142, secured to lever 149 by pivotally mounted link 153, is raised as will be especially clear from the examination of Fig. 7.

Assuming that the strip 52 has been advanced to the position shown in Fig. 7, and the gates 142—143 have been closed, the rotation of spindle 71 in a counterclockwise direction as seen in Fig. 7 will cause the fingers 121 to engage in the T-shaped notches 65 and to wind the strip helically in such a way as to lay up successive layers of shading material in the position seen in Figs. 10 and 11, or as seen in Figs. 24, 25, 26 and 27. Since the gates supported in their ways 144 and 145 cannot be laterally deflected by the accumulating layers of the strip 52, the ejector collar 127 is thrust to the left as seen in Figs. 10 and 11 against the pressure of spring biased plungers 131, and in the event that the strip 52 binds upon the fingers 121, the finger collar 120 can be pushed to the left against springs 124 as shown in Fig. 11.

In the timing of the machine as described below, the accumulation of layers helically, when completed, will be followed by the automatic opening of the gates to permit of the assembly with the shading coil of the poles of the pole ring 50; after which ejector rod 138 will be moved forceably to the right under hydraulic power as described above whereby to force the ejector plate 137 against the several ejector pins 135. This will force the ejector collar 127 against the shading ring portion 63 for forceable ejection of the entire assembled product as seen in Fig. 12.

*Pole ring feed and assembly*

Spindle 73 about which the pole ring portion of the machine is "centered" is another hollow spindle equipped at the left end with a chucking device 155 to receive, hold, advance, and deliver pole ring 50 in a final assembling operation.

The spindle 73 is carried by pillow blocks 156—157 and at 158 is provided with a thrust bearing against which ram 159 of ram cylinder 160 is aligned parallel with the axis of the spindle. The stroke of this cylinder and ram assembly is sufficiently long so that a pole ring 50 held in the chucking device at 155 can be moved longitudinally of the spindle 73 to close the intervening space between the retracted position of the chucking device and the winding head so as to insert the poles of ring 50 into the punched holes and notches in coiled strip 52. Accordingly, the spindles 71 and 73 must be extremely accurately timed in their rotation, and to accomplish this, a coordinating shaft 165 (see Fig. 2) extends from a point of gear connection at 166 between the spindle 71 and the coordinating shaft and elongated pinion 167 below spindle 73 where such elongated pinion is engaged with gear 168 mounted to spindle 73. Thus as the coordinating shaft 165 rotates in accord with the rotation of spindle 71, the spindle 73 will move in accord with spindle 71 by reason of the gear connections referred to, even though spindle 73 is reciprocated for pole ring assembly purposes by the hydraulic ram and cylinder 159—160.

The chucking device at 155 is constructed as shown in Figs. 10, 13 and 20. Spindle 73 is reduced in diameter to provide a short stub shaft 170 and a shoulder 171 upon and against which is mounted a chucking cylinder 172 interiorly provided with means for mounting spring fingers 173 biased outwardly by compression spring 174. Pole ring 50 is receivable in a counterbore at 175 so as to be seated firmly against a shoulder 176. It has already been noted that a notch 54 is provided in the edge of the pole ring. This notch finds its counterpart in a suitable raised portion 177 in the shoulder 176 to assure proper location and orientation of the pole ring with respect to the chucking device at the end of spindle 73. (See Figs. 20 and 21.)

Placement of successive pole rings in the chucking device at 155 is accomplished by means of transfer arm 180 mounted upon shaft 181 (see Fig. 1) which extends for a short distance parallel to spindle 73 and is carried by gear box 182 provided with motivating apparatus whereby the arm is moved in a circle in an indexing motion involving three dwell points and, during the interval of such dwell, the arm is pulled to the right with its shaft as will now be explained.

A supply trough for a number of pole rings is shown at 183. It is simply a trough rectangular in cross section as shown in Fig. 23, but with a channel shaped insert 184 along one interior wall so disposed in view of the interior dimensions of the trough that pole rings may not be inserted for passage along the trough unless the legs of the channel shaped member 184 are received in the notches 60 in the pole ring. Thus as the pole rings are inserted in the trough, at the front end as seen in Fig. 5, they may pass by gravity successively downwardly until they reach the bottom of the trough where a tip of a spring latch 187 prevents their further downward passage. The side and front walls of the trough 183 are relieved at 186 to permit a free delivery of the successive rings, but the cupped, hooked portion 187 of the latch mounted pivotally at 188 is so swingable under the urge of a solenoid actuated member 189 as to prevent the accidental displacement of the lowermost pole ring (see Fig. 22) until, in the timing of the machine, the solenoid actuated member 189 is withdrawn and the latch is returned to its dotted line position by spring 190. The ring, now ready for pick up by the arm 180, is held at the bottom of the trough by bracket 185.

Assuming that the arm 180 has been in a position shown in dotted lines at 191 in Fig. 5 and has just delivered a ring 50 to the chucking device, the next movement of the arm would involve a thrust of the shaft 181 to the left, as seen in Fig. 1, sufficiently to clear the arm from the chucking device and the delivered ring, and then a swinging movement counterclockwise as seen in Fig. 5 to the dotted line position shown at 192. Here the arm 180 would be so aligned as to position a receptor 193 on the end arm 180 opposite the ring 50 which is in the position shown in Fig. 22 at the bottom of the delivery chute. At this time, the ram 189 of the solenoid operated device will have released the cupped, hooked member 187 for spring biased retraction thereof. This will permit the receptor 193 to move into position for pickup of the ring 50. This, of course, involves a movement of the shaft 181 to the right a short distance which is followed immediately by a corresponding movement to the left as the receptor removes the lowermost ring 50 from the trough 183 to the left. Immediately thereafter, the arm 180 swings counterclockwise to the position shown in full lines in Fig. 5 where, with a longitudinal movement of the shaft 181 to the right, the arm dwells, while holding the pole ring in readiness for completion of transfer of such ring to the chuck at 155. This dwell is assured by contact of the arm 180 with a switch 194 (see Fig. 5).

Accurate positioning of the arm 180 in each of the positions where accuracy is necessary is assured by heavy fixed dowels 195 and 196 receivable in bushing 197 as will be clear from an examination of Figs. 1 and 5.

The receptor 193 is shaped to grasp each successive ring accurately and hold it firmly so that the ring which was held in a predetermined position by the channel 184 is accurately delivered to the chucking device at 155 with the pole pieces aligned properly for accurate assembly with the helically coiled shading coil.

Obviously, as the ram 159 and cylinder 160 thrust the spindle 73 to the left as seen in Fig. 2, gear 168 will slide with the spindle 73 to which the gear 168 is fixed, but the gear 168 is constantly meshed with elongated pinion 167, and at the time the ring 50 in the chucking device approaches the coiled shading strip 52, the alignment which was assured by proper delivery of the pole ring 52 to the chucking device assures the accuracy of alignment in the ultimate assembly.

At the time the particular pole ring 50 is presented for assembly with a helically coiled strip 52, the form of the coil is substantially a true helix as shown in Fig. 28. The various elements of the coil are snugly associated due to the fact that the coil has been formed within closed gates 142 and 143 which confine the forming coil against the annular margins of the ejecting collar 127. However, as the pole pieces are inserted through the slots and punched openings in the shading ring, the pole pieces, as shown in Figs. 11, 12 and 13, protrude beyond the "laminations" of the coil, and the firm abutment of the front end of the chucking device against the coils compresses them against the flanges 117 and 127 with sufficient firmness to offset the helical coils in the completed product 100 as shown at 195. As soon as the compacting action is completed, the chucking device and spindle 73 return to the position shown in Fig. 2 and the ejecting action referred to above takes place. The bias of spring plungers 131 with some possible assistance from the springs 124 in the event that the fingers 121 were slightly thrust back during the assembling operation (see Fig. 12), forces the parts into the position shown, and the product is stripped off of the mandrel and fingers.

Upon retraction of the ejecting rod 138, the ejecting collar 127 must be thrust back against the bias of spring plungers 131 so that the gates 142 and 143 may close against the fingers 121. To accomplish this, there is a forked lever 200 positioned to fulcrum about a pin 201 mounted in blocks carried by fixed plate 141, and the upper end of the lever 200 is shaped as shown in Fig. 6 to provide a mounting for a control switch actuator for purposes described below. Secured, however, to plate 141 is a bracket 202 so disposed as to provide a mounting for a strong compression spring 203 confined between the bracket 202 and the lever 200. Thus the lever 200, as to its forked fingers extending downwardly against the face of the flaring skirt-like configuration 128 of the ejecting collar 127 assures that the ejector is forced to retracted position as soon as the direct pressure of the hydraulically operated ejector rod is relieved.

Switch 212 cannot be closed unless ejecting collar 127 is back in position to receive copper stock 52 and also to act as a safety feature in preventing gates 142 and 143 from clamping on collar 127, in the event 127 was not retracted to its normal position.

Timing

This machine is largely hydraulically operated and in the description of the sequence of operations involving timing, it will be understood that the electric control circuits and devices are used in large part to control valves which, in turn, control the actual operating hydraulic elements.

Assuming that the circuit for the control of the entire machine is energized by the closing of a master control switch at a time when the cut-off punch 89 is in full engagement with the female die 90 as a result of a cut-off operation previously completed, the first operations of the machine will include the opening of a valve to actuate ram 96 in cylinder 95 for retraction of the cut-off punch to the position shown in Figs. 14 and 16. The opening of the valve to cause this cut-off punch retraction is controlled by a solenoid under control of limit switch 210 (see Fig. 2). This limit switch is closed when the ejector is properly retracted as described above, and the lever 200 assumes the position shown in Fig. 6 whereby to cause the adjustable pressure device at 211 to bear upon roller 212 and press the limit switch 210 to closed position.

At the same time that the cut-off punch is retracted by the lowering of the ram 96, a bracket 213 secured to the ram as shown in Fig. 3 is moved downwardly so that a foot 214 at the lower end of the bracket will contact and press the actuating button of switch 215 whereby to close it. As a result of the closure of switch 215, cylinder 80 and ram 81 operate to advance strip 52 to the position shown in Figs. 7, 24 and 25. This, as described above, is an advance of the strip about 5¾ inches and is sufficient to engage the lower portion of the strip with fingers 121.

At the same time that the switch 210 is closed, a circuit is energized to accomplish the opening of a valve controlling cylinder 220, the ram 221 for which is connected to gate rod 148. Upon application of hydraulic pressure to the upper portion of the double acting cylinder 220, the gate rod 148 is forced downwardly for closure of the gates 142 and 143. These gates then assume the position shown in Fig. 6.

When the ram 81 of cylinder 80 completed its stroke to advance the strip 52 into the position shown in Fig. 7, a header 222 forming part of the feed head 78 strikes an adjustable stop 223, and at the same time a switch actuator 224, forming part of the header 222, strikes switch 225. The closure of the switch 225 controls the application of the hydraulic pressure to the small double acting cylinder 82 to retract the blade 77 from the strip 52. Coincident with the disengagement of the blade from the strip, the switch 225 will have caused the double acting cylinder and ram 80—81 to be energized for retraction of the head 78 to its rearmost position where it will again be ready to engage the strip for the next feeding operation.

Also coincident with the retraction of the feed head 78 under the control of switch 225, this same switch actuates a ram 227 and cylinder 228 to thrust the ram forwardly. A connecting rod 230 connected to ram 227 is likewise connected to a stop rocker arm 231 pivoted at 232, and it is on the under side of rocker arm 231 that there is located a very heavy stop shoulder 233 in position to be engaged by a heavy stop 234 which extends radially of spindle 71. It is against this stop shoulder 233 that the stop 234 abuts when the spindle is brought to rest for a product assembling operation, but since this description has now progressed to the point where an edge winding operation is to be commenced, it will be understood that the closure of switch 225 has caused the ram 227 to be thrust upwardly to release the shoulder 233 from the stop 234 and the winding operation may commence.

The upward movement of the ram 227 and the connecting rod 230 bring actuator 236 mounted to the ram into contact with switch 235 to close it, and the main hydraulic motor 108 for rotation of spindle 71 is thus placed in operation. It will be noted that up to this point each of the successive steps in the sequence of operations of the machine has been caused by the closure of a switch accomplished by the movement of one of the moving parts of the machine. However, there is, in the further timing of the sequence of operations, requirement for a special timing apparatus which is shown most clearly in Figs. 2 and 4.

In position for toothed engagement with pinion 240 on spindle 71, there is a gear 241 on jack shaft 242 equipped with pinion 243. This pinion 243 is meshed with a large timing gear 244. The timing gear, therefore, rotates in the direction indicated by the arrow.

On one face of the timing gear as shown in dotted lines in Fig. 4, and as shown on the right of the timing gear in Fig. 2, there is a cam 245. On the other side of the timing gear and somewhat "behind" cam 245 in a timing sequence, there is a cam 246. These two cams comprise a set, and there are a number of these sets arranged around the periphery of the gear 244. Cam 245 is positioned to engage the actuating member 247 of valve 248 which is used when actuated by cam 245 to reduce the flow of hydraulic fluid to the motor 108, thus slowing the operation of the spindle 71. When the motor has been thus slowed, cam 246 comes into engagement with a switch 250, the purpose of which is to control cylinder 228 whereby to pull downwardly upon connecting rod 230 for engagement of the shoulder 233 with the positive stop 234. Completion of the third rotation of the spindle in a winding operation is thus positively brought to a close and there is cessation of all spindle operations momentarily while a cut-off of the strip 52 is completed.

When the arm 231 was brought down, the actuator 236 contacted switch 251 which has time delay characteristics such that the cut-off operating cylinder will be energized for a cut-off of strip 52 while the spindle is at rest.

Foot 214 is raised in the completion of the cut-off operation and it strikes the operating element of a switch 255 controlling the cylinder 228 for raising connecting rod 230 and releasing stop 234. This brings actuator 236 against switch 235 for operation of motor 108 and the spindle turns two full turns, one for completing the winding of the strip and the second turn for tightening the helix windings.

Now another cam, 256 on large timing gear 244 strikes actuating member 247 of valve 248 to slow up the hydraulic motor 108 and cam 258 immediately "behind" cam 256 actuates switch 250 for another operation of the arm 231 downwardly and a "final" stoppage of spindle 71. The final movement of the gear 244 just prior to the engagement of the stop 234 with the shoulder 233 brings cam 259 on the gear into contact with the actuator of switch 260 for the opening of the gates 142 and 143 in readiness for the assembly of the pole ring with the now completely spirally wound strip 52.

Assembly timing

It will be noted that there is attached to the ram 221 for operation of the gates 142 and 143 a switch actuator 265 so positioned as to actuate a switch 266 (see Fig. 3). This switch controls the actuation of hydraulic cylinder 160, the ram 159 of which pushes spindle 73 to the left as seen in Figs. 1 and 2. At the time this occurs, a pole ring 50 has already been placed in the chucking device 155 and the poles 55 and 56 have been properly aligned for projection into punched openings 64 and slots 65 in strip 52 as described above. While thus maintained, in alignment according to the engagement of pinion 167 and gear 168, the ring 52 is translated into assembly with the spirally wound strip 52, and the insertion of the poles into the openings in the shading ring is accomplished with such force that the flared margin 130 of ejector collar 127 (see Fig. 9) is thrust inward against the spindle 71 despite the pressure spring biased plunger 131. In fact the pressure of the assembly operation is such that the spirally wound strip 52 assumes the position shown in Fig. 10 and Fig. 33 where it will be seen that the convolutions of the strip 52 theretofore assuming a true helix have been flattened into paralleism except that the ends of the strip have caused an offset at 195.

As the ram 159 of the hydraulic cylinder 160 approaches the limit of its movement to the left in an assembling operation, an actuator 271 is positioned to be contacted by the side surface of gear 168 and actuates switch 272. This switch has time delay characteristics to allow for time to "squeeze" the assembled parts into full assembled relationship. The ram 159 is withdrawn hydraulically and pulls with it spindle 73. The rearward motion of the spindle 73 causes actuator 275 mounted on and moving with the ram 159 to actuate switch 276. When the switch 276 is closed, the ram in cylinder 99 forces ejector rod 138 to move to the right in spindle 71 for forceable thrust against plate 137. This thrust is communicated to ejector pins 135 so that they exert pressure to the right against shoulder 136 forming part of the ejector collar 127. The gates 142 and 143 being in retracted position, the pressure of the ejector ring forces the assembled shading ring material 52 and the pole ring 50 to the right as shown in Fig. 12 whereupon the product 100 drops down into a chute for delivery from the machine.

Closure of the switch 276 also starts the motor 280 which drives the transfer mechanism including the arm 180 as described above.

One of the features which makes it possible to edge wind the strip 52 in the configuration shown fragmentarily in Fig. 34 is the fact that the strip 52 is made as shown in Fig. 33. Attention has been called above to the fact that a portion of the strip 52 includes a strip contoured at 63, punched or apertured at 64. "Exteriorly" at 275, the curve is a true segment of the circle coinciding with the complete circle of the completed product. This portion 275 of the contour of the exterior of the strip is braced by struts 276—277 and the relatively short segment 278 to comprise a stable section of the annulus and it does not change its shape appreciably during the edge winding operation. Between the sections 63 and corresponding generally with the notches 65, there are portions at 62 of the strip 52 somewhat reversely curved marginally at 280. These portions of the strip are destined to become just as definitely a part of the annulus upon the same lines of curvature as represented by the curves of sections 63, but the sections 62 are not braced as at 276—278 thus permitting the "straight" strip 52 to assume an annular configuration as shown, for instance, in Fig. 27.

To assist in forcing the sections 62 to assume their portions of the annular configuration, the feed-in groove or slot at 286 is, of course, as shown in Fig. 25, sufficiently large in vertical dimension to freely accommodate the vertical dimension of the sections 63, but as each of these sections 63 conforms to the edge winding mandrel surface 113, the input slot 286 is provided with a diminishing vertical dimension at 281 to force the sections 62 to conform to the same diameter to which the surfaces 275 must conform. The molecular flow of the metal at 62 at the time this section 62 is forced to conform to the dimensions of the annulus as seen in Fig. 27, is accompanied by the closing of surfaces 282 and 283 against the fingers 121.

It has been found that as the section 62 and the outer margin thereof conforms to the restricted slot 286 at 281, the curvature of the edge margin 285, which is to demark the opening for a pole piece forming part of the ring 50, assumes a curvature complementary to the circle upon which the outside surface of the pole pieces is formed.

It is of major importance that the circumference of the shading material be accurate to a given diameter, and it has been found in the carrying out of the process and the operation of the machine above described that the radial dimension of the portions 63 (see Figs. 33 and 34) can be maintained with superlative accuracy and that this same radial dimension can be maintained as to the portions 62 with the result that the completed product presents a perfect exterior circular dimension for the reception of a cap-like dust cover in accord with the demands of this art. This is a distinct advance in the art since previous step by step blanking operations involving washer-like elements cannot be accurate in these dimensions according to accepted shop practices.

I claim:

1. A frame based edge winding machine for edge winding a strip of material having edge notches, said machine having a power operated rotatable mandrel supported by said frame and provided with outstanding fingers, a material feeder including means for guiding and advancing the strip edgewise onto the mandrel at right angles to the mandrel axis in position for engagement of the fingers in said notches, said means including a slot having walls closely encompassing the strip adjacent the mandrel, said means providing thereby a reluctance to travel of the strip as it is drawn onto the mandrel by said fingers.

2. The machine of claim 1 in which the means for advancing the strip material onto the mandrel includes a reciprocable feeder blade having a cross head mounting for lateral reciprocation of the blade into and out of engagement with the material, and a cut off member mounted adjacent the head mounting for cutting the material between reciprocations of the blade the power operated mandrel being connected in timed relation to the reciprocable feeder blade for advance of the strip material into engagement with one of the mandrel fingers after operation of the cut off member.

3. A frame based machine for edge winding strip material having edge notches, said machine having a cylindrical mandrel provided with radially extending fingers, said mandrel being supported by said frame and provided with connections for power rotation on the axis thereof, means for guiding said strip material to the mandrel edgewise and at right angles of the axis of the mandrel for a wrapping operation relative to the mandrel with the notched edge in engagement with said fingers whereby to draw the strip onto the mandrel, a retractably mounted gate shaped to encompass the mandrel and proscribe a zone on the mandrel surface to receive the strip in successive helical turns, and a collar resiliently mounted about the mandrel in a position opposed to said gate for pressure contact against the edge wound material on the mandrel accumulated in said zone.

4. The machine of claim 3 in which the gate is mounted for movement to and from the mandrel, said mandrel is provided with radially extending fingers for engagement with an edge of the material whereby to draw the strip onto the mandrel, and an ejector collar biased for movement toward the gate is positioned externally of the mandrel and fingers and provided with means for ejecting the edge wound strip when the gate is moved from the mandrel.

5. In a frame based machine for winding punched strip material in helically wound successive laminations, a spindle at one end of said machine and having a power operated frame supported mandrel, said mandrel having means for engaging said punched strip material and drawing it onto the mandrel in helically successive laminations, a feeder for said punched strip material positioned in supported relation to the frame whereby to provide said material to the mandrel in a direction approximately at right angles to the mandrel from one side thereof, a second spindle concentric with the mandrel spindle and located at the other end of the machine in supported relation to the frame, a chucking device at the end of the second spindle facing the mandrel, an arm provided with a material handling member mounted for swinging motion whereby to feed the material into the chucking device, an interlock shaft extending laterally of the mandrel shaft and second shaft and connected to them for coordinate timed rotation, and means for forcibly projecting the second shaft toward the mandrel whereby to engage the material in the chuck with the punched material on the mandrel.

6. A frame based edge winding apparatus for winding strip material and assembling pole rings therewith including a rotatable frame supported mandrel upon which strip material is receivable in product winding relation, a frame supported feeder for strip material to be passed to the mandrel, frame supported gate apparatus moveable to and from mandrel enclosing relationship, product ejector apparatus associated with the mandrel and mounted to move to and from product ejector positions, a spindle opposite the mandrel provided with a pole ring chucking device and mounted for movement to and from the mandrel, and an arm mounted for indexing, swinging movement and provided with a pole ring feeding device swingable on the arm to and from positions for picking up and delivering pole rings for reception in said chucking device.

7. The apparatus of claim 6 in which the elements are connected and motivated in timed relationship to close the gate apparatus, feed strip material to the mandrel, turn the mandrel in a strip edge winding operation, open the gate apparatus, move a chucked pole ring in the chucking device into assembly with the edge wound strip, return the chucking device from the mandrel and finally eject the assembled strip and ring from the mandrel.

8. The apparatus of claim 6 in which the gate is shaped to force the strip into helical configuration.

9. A frame based edge winding machine for edge winding in successive helical laminations a strip of material having edge notches and lineally spaced apertures, said machine having a power operated rotatable mandrel supported by said frame and provided with outstanding fingers, and a material feeder including means for guiding the advancing strip edgewise onto the mandrel at right angles to the mandrel axis in position for engagement of the fingers in said notches, said means including a slot having walls closely encompassing the strip adjacent the mandrel, and said means providing thereby a reluctance to travel of the strip as it is drawn and formed onto the mandrel by said fingers, the diameter of the mandrel in relation to the lineal spacing of said apertures providing alignment of said apertures of successive laminations.

References Cited in the file of this patent

UNITED STATES PATENTS

| | | |
|---|---|---|
| 1,920,154 | Carlson | July 25, 1933 |
| 1,920,155 | Fisher | July 25, 1933 |
| 2,385,619 | Fausset | Sept. 25, 1945 |
| 2,422,549 | Hogin | June 17, 1947 |
| 2,604,138 | Harrison | July 28, 1952 |